(12) United States Patent
Sugaya (10) Patent No.: US 11,184,184 B2
(45) Date of Patent: Nov. 23, 2021

(54) COMPUTER SYSTEM, METHOD FOR ASSISTING IN WEB CONFERENCE SPEECH, AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 16/623,105

(22) PCT Filed: Jun. 28, 2017

(86) PCT No.: PCT/JP2017/023809
§ 371 (c)(1),
(2) Date: Feb. 19, 2020

(87) PCT Pub. No.: WO2019/003357
PCT Pub. Date: Jan. 3, 2019

(65) Prior Publication Data
US 2020/0177405 A1 Jun. 4, 2020

(51) Int. Cl.
*G06F 15/16* (2006.01)
*H04L 12/18* (2006.01)
*H04M 3/56* (2006.01)

(52) U.S. Cl.
CPC ........ *H04L 12/1827* (2013.01); *H04M 3/568* (2013.01)

(58) Field of Classification Search
CPC .......................... H04L 12/1827; H04M 3/568
USPC .......................................................... 709/204
See application file for complete search history.

(56) References Cited

U.S. PATENT DOCUMENTS

| 8,095,120 B1* | 1/2012 | Blair | H04M 3/562 |
| | | | 455/416 |
| 10,057,748 B1* | 8/2018 | Wolf | H04W 8/005 |
| 10,291,783 B2* | 5/2019 | Mehta | H04N 7/152 |
| 2011/0063103 A1* | 3/2011 | Lee | H04W 8/005 |
| | | | 340/505 |

(Continued)

FOREIGN PATENT DOCUMENTS

| JP | 2008079024 A | 4/2008 |
| JP | 2015070460 A | 4/2015 |

(Continued)

OTHER PUBLICATIONS

International Search Report issued in PCT/JP2017/023809 dated Sep. 12, 2017.

*Primary Examiner* — Wing F Chan
*Assistant Examiner* — Joseph R Maniwang
(74) *Attorney, Agent, or Firm* — Norton Rose Fulbright US LLP; James R. Crawford (57) ABSTRACT

An object of the present disclosure is to provide a computer system, a sound assistance method for a Web conference, and a program which can easily perform a conversation without setting a dedicated microphone. The computer system, which performs sound assistance for a Web conference system by using a microphone of a user terminal other than a terminal used in a Web conference, is configured to connect the Web conference system to the user terminal for a data communication, acquire a sound from the microphone of the user terminal, synthesize Web conference data from the Web conference system and the acquired sound, and output synthetic data after synthesizing.

7 Claims, 5 Drawing Sheets

(56) References Cited

U.S. PATENT DOCUMENTS

| | | | |
|---|---|---|---|
| 2013/0106977 A1 | 5/2013 | Chu et al. | |
| 2015/0208035 A1 | 7/2015 | Chu et al. | |
| 2018/0176272 A1* | 6/2018 | Zur | H04L 65/80 |
| 2020/0053072 A1* | 2/2020 | Glozman | H04W 12/06 |

FOREIGN PATENT DOCUMENTS

| | | |
|---|---|---|
| JP | 2015512168 A | 4/2015 |
| JP | 2016010010 A | 1/2016 |
| JP | 2016174313 A | 9/2016 |

\* cited by examiner

COMPUTER SYSTEM, METHOD FOR ASSISTING IN WEB CONFERENCE SPEECH, AND PROGRAM

CROSS-REFERENCE TO RELATED APPLICATIONS

This application is a 371 of International Patent Application No. PCT/JP2017/023809 filed on Jun. 28, 2017, which is incorporated herein by reference in its entirety.

TECHNICAL FIELD

The present disclosure relates to a computer system, which performs sound assistance for a Web conference system by using a microphone of a user terminal other than a terminal used in a Web conference, a sound assistance method for the Web conference, and a program.

BACKGROUND

In recent years, people in distant places have held Web conferences via a public line network by using a Web conference system with monitors, cameras, microphones and loudspeakers. In such a Web conference system, participants input sounds through dedicated microphones used in the Web conference system.

A sound input method for such a Web conference system includes determining a speaker through setting multiple microphones near a camera and determining a direction of a sound source (refer to Patent Literature 1).

LITERATURE IN THE EXISTING ART

Patent Literature

Patent Literature 1: Japanese Patent Application Laid-open number 2016-10010

SUMMARY

Problems to be Solved

However, in Patent Literature 1, a necessity for setting a dedicated microphone or an uncertainty to determine a speaker may lead to difficulties for a conversation.

An object of the present disclosure is to provide a computer system, a sound assistance method for a Web conference, and a program, which can easily perform the conversation without setting the dedicated microphone.

Solutions to the Problems

The present disclosure provides solutions described below.

The present disclosure provides a computer system, which performs sound assistance for a Web conference system by using a microphone of a user terminal other than a terminal used in a Web conference. The computer system includes a connection unit, an acquisition unit, a synthesis unit, and an output unit. The connection unit is configured to connect the Web conference system to the user terminal for a data communication. The acquisition unit is configured to acquire a sound from the microphone of the user terminal. The synthesis unit is configured to compare Web conference data from the Web conference system with the acquired sound, and select a sound with a larger amplitude and delete a sound with a smaller amplitude according to a specified interval, thereby performing synthesis. The output unit is configured to output synthetic data after the synthesis.

According to the present disclosure, the computer system, which performs the sound assistance for the Web conference system by using the microphone of the user terminal other than the terminal used in the Web conference, connects the Web conference system to the user terminal for the data communication, acquires the sound from the microphone of the user terminal, compares the Web conference data from the Web conference system with the acquired sound, and selects a sound with a larger amplitude and deletes a sound with a smaller amplitude according to a specified interval, thereby performing synthesis, and outputs the synthetic data after the synthesis.

Though the present disclosure is a category of computer system, other categories such as a method and a program have the same functions/effects as the category of computer system.

DETAILED DESCRIPTION

Some embodiments for implementing the present disclosure will be described below with reference to the drawings. It is to be noted that the embodiments are merely examples and not intended to limit the scope of the present disclosure.

Summary of a Sound Assistance System 1 for a Web Conference

Figure 1:
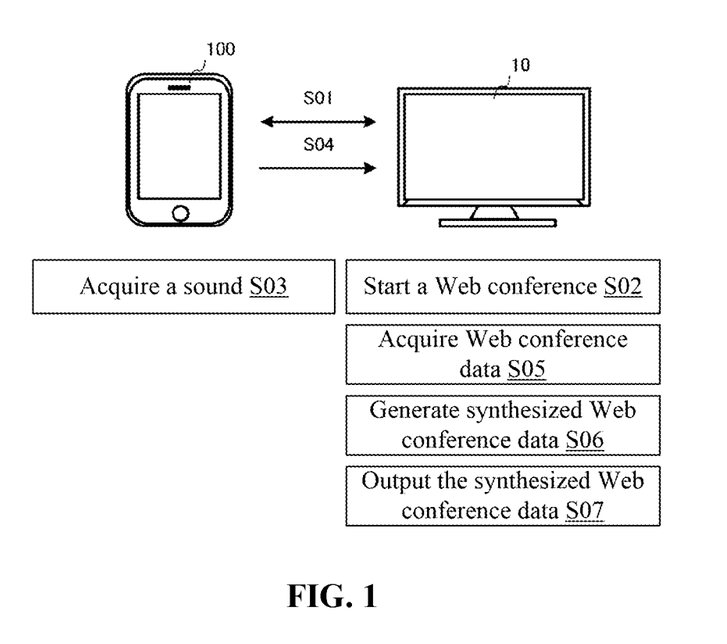
FIG. 1 is a diagram illustrating a summary of a sound assistance system 1 for a Web conference.

A summary of an optional embodiment of the present disclosure is described based on FIG. 1. FIG. 1 is a diagram illustrating the summary of the sound assistance system 1 for the Web conference as an optional embodiment of the present disclosure. The sound assistance system 1 for the Web conference is a computer system. The computer system includes a computer 10 and a user terminal 100, and performs sound assistance for a Web conference system by using a microphone of the user terminal 100 other than the computer 10 used as a terminal used in the Web conference.

It is to be noted that in FIG. 1, the number of computers 10 and the number of user terminals 100 may be changed appropriately. In addition, the computer 10 and the user terminal 100 are limited to practical apparatuses, and may also be virtual apparatuses. In addition, processing described later may be implemented by any one of the computer 100 or the user terminal 100 or by a combination of the computer 100 and the user terminal 100. In addition, the computer 10 and the user terminal 100 may also be connected via a computer that has a server function.

The computer 10 is a computer apparatus which constitutes the Web conference system. The computer 10 includes various devices which are required in the Web conference, such as a camera, a microphone, a display, and a loudspeaker. The computer 10 and the user terminal 100 are connected for a data communication. The computer 10 and the user terminal 100 are connected for the data communication by a short-range communication, by a two-dimensional code, or by imputing a personal identification number (PIN) code.

The user terminal 100 is a terminal apparatus connected to the computer 10 for the data communication. The user terminal 100 is a terminal apparatus carried by a participant of the Web conference. The user terminal 100 is, for example, a portable phone, a portable information terminal, a tablet terminal or a personal computer, and in addition, the user terminal 100 may also be an electrical appliance such as a netbook terminal, a slate terminal, an electronic book terminal or a portable music player, a wearable terminal such as smart glasses or a head-mounted display, or other object.

The user terminal 100 is connected to the computer 10 for the data communication (step S01). The user terminal 100 is connected to the computer 10 for the data communication by the short-range communication for connection identification (pairing by Bluetooth). In addition, the user terminal 100 is connected to the computer 10 for the data communication by the two-dimensional code for the connection identification (the computer 10 displays the two-dimensional code used for a connection, and the user terminal 100 reads the two-dimensional code to perform the connection). The user terminal 100 is connected to the computer 10 for the data communication by inputting the PIN code for the connection identification (the computer 10 displays the PIN code used for the connection, and the user terminal 100 accepts an input of the PIN code to perform the connection).

The computer 10 starts the Web conference (step S02). The computer 10 transmits and receives Web conference data (image data such as a dynamic image and a stationary image captured of the participant, and sound data) with the Web conference system at a remote position which is not shown in FIG. 1 via a public line network or the like.

The user terminal 100 acquires a sound of a user from a microphone of the user terminal 100 (step S03). The user inputs the sound into the user terminal 100 by uttering the sound towards the microphone. The user terminal 100 acquires the inputted sound of the user.

The user terminal 100 sends terminal-side sound data representing the user's sound to the computer 10 (step S04).

The computer 10 receives the terminal-side sound data and acquires the Web conference data (step S05). The computer 10 captures images of the user who participates in the Web conference, such as dynamic images and stationary images of the whole body and the face of the user, acquires the sound of the user, and takes the images and sound of the user as the Web conference data. There is a time difference between a sound acquired by the computer 10 and the sound acquired by the user terminal 100. The time difference is generated due to a difference between distance from the user terminal 100 to the user and that from the computer 10 to the user.

The computer 10 synthesizes the Web conference data acquired by itself and the terminal-side sound data to generate the synthesized Web conference data (step S06). The computer 10 synthesizes the Web conference data acquired by itself and the terminal-side sound data by correcting respective acquisition moments to generate the synthesized Web conference data. The computer 10 compares an amplitude of sound data included in the Web conference data with an amplitude of the terminal-side sound data, and based on the time difference between the amplitudes, synthesizes multiple pieces of sound data into one piece of sound data in a case where a same user utters the sound, so as to generate the synthesized Web conference data.

The computer 10 outputs the synthesized Web conference data to the connected Web conferencing system at the remote position which is not shown (step S07).

The above is the summary of the sound assistance system 1 for the Web conference.

System Composition of a Sound Assistance System 1 for a Web Conference

Figure 2:
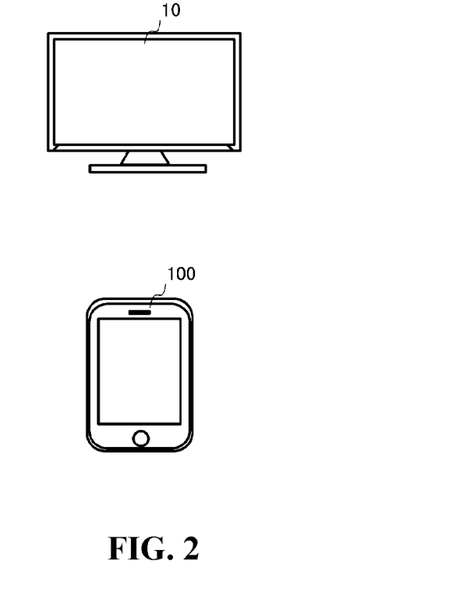
FIG. 2 is an overall compositional diagram of a sound assistance system 1 for a Web conference.

The system composition of the sound assistance system 1 for the Web conference as an optional embodiment of the present disclosure is described based on FIG. 2. FIG. 2 is a diagram illustrating the system composition of the sound assistance system 1 for the Web conference in an optional embodiment of the present disclosure. The sound assistance system 1 for the Web conference is a computer system. The computer system includes a computer 10 and a user terminal 100, and performs sound assistance for a Web conference system by using a microphone of the user terminal 100 other than a terminal (the computer 10) used in the Web conference.

It is to be noted that the number of various apparatuses and types of the various apparatuses for constituting the sound assistance system 1 for the Web conference may be changed appropriately. In addition, the sound assistance system 1 for the Web conference is not limited to a practical apparatus, and may also be implemented by a virtual apparatus. In addition, processing described later may also be implemented by any one or a combination of the various apparatuses for constituting the sound assistance system 1 for the Web conference.

The computer 10 is the above computer apparatus with functions described later.

The user terminal 100 is the above terminal apparatus with functions described later.

Description of Functions

Figure 3:
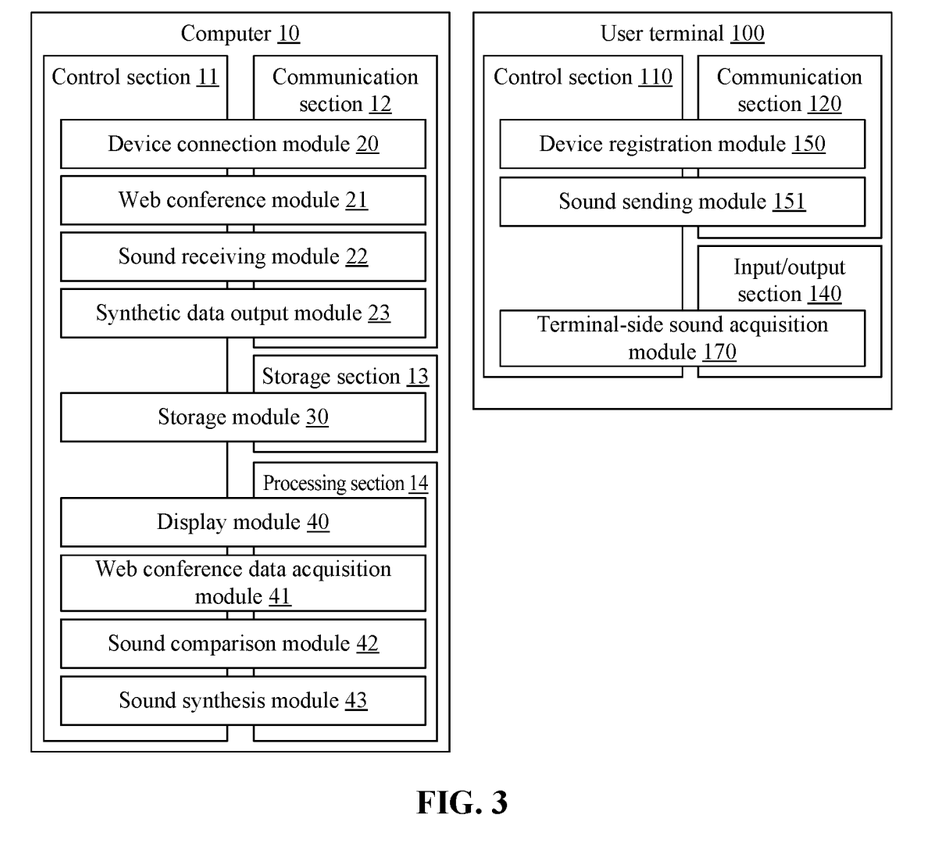
FIG. 3 is a functional block diagram of a computer 10 and a user terminal 100.

Based on FIG. 3, the functions of a sound assistance system 1 for a Web conference in an optional embodiment of the present disclosure is described. FIG. 3 is a functional block diagram of a computer 10 and a user terminal 100.

As a control section 11, the computer 10 includes a central processing unit (CPU), a random access memory (RAM), a read only memory (ROM) and the like. As a communication section 12, the computer 10 includes a device which can communicate with other devices such as a short-range communication device and a wireless-fidelity (Wi-Fi) adaptive device in conformity to IEEE802.11. In addition, as a storage section 13, the computer 10 includes a data storage section which is implemented by a hard disk, a semiconductor memory, a recording medium, a memory card and the like. In addition, as a processing section 14, the computer 10 has various devices for performing various computing, processing, and the like.

In the computer 10, the control section 11 implements a device connection module 20, a Web conference module 21, a sound receiving module 22, and a synthetic data output module 23 by reading specified programs and cooperating with the communication section 12. In addition, in the computer 10, the control section 11 implements a storage module 30 through reading specific programs and cooperating with the storage section 13. In addition, in the computer 10, the control section 11 implements a display module 40, a Web conference data acquisition module 41, a sound comparison module 42, and a sound synthesis module 43 through reading specified programs and cooperating with the processing section 14.

Similar to the computer 10, as a control section 110, the user terminal 100 includes a CPU, a RAM, a ROM and the like and as a communication section 120, the user terminal 100 includes a device which can communicate with other devices. In addition, as an input/output section 140, the user terminal 100 includes various devices such as a display section which outputs and displays data and images when controlled by the control section 110, an input section such as a touch panel, a keyboard, and a mouse which accepts an input from a user, a sound pickup apparatus such as a microphone which collects a sound from the user, a sound emission apparatus such as a loudspeaker which broadcasts the sound.

In the user terminal 100, the control section 110 implements a device registration module 150 and a sound sending module 151 through reading specified programs and cooperating with the communication section 120. In addition, in the user terminal 100, the control section 110 implements a terminal-side sound acquisition module 170 through reading specified programs and cooperating with the input/output section 140.

Connection Processing

Figure 4:
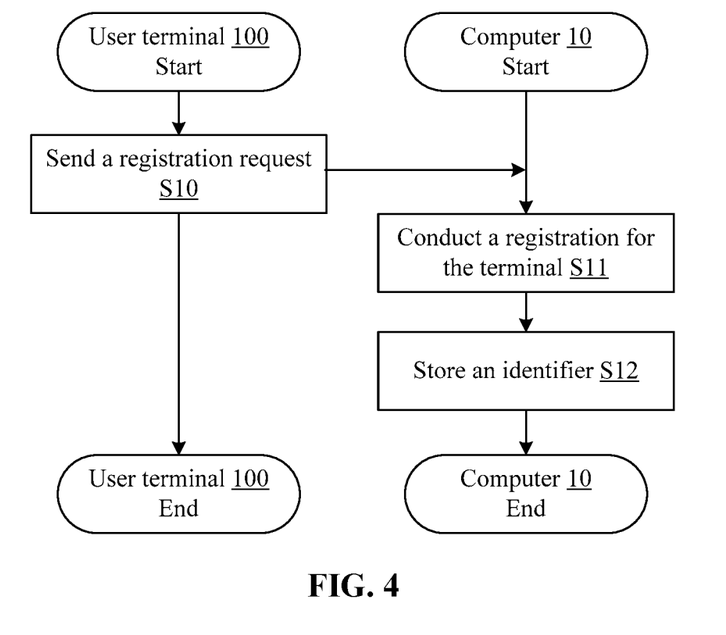
FIG. 4 is a flowchart of connection processing performed by a computer 10 and a user terminal 100.

The connection processing performed by the sound assistance system 1 for the Web conference is described based on FIG. 4. FIG. 4 is a flowchart of the connection processing performed by the computer 10 and the user terminal 100. Processing performed by the modules of the above-mentioned apparatuses is described together with the connection processing.

The device registration module 150 accepts a device registration for a data communication connection with the computer 10 and sends a registration request to the computer 10 (step S10). Processing performed by the device registration module 150 in step S10 is described below.

The device registration module 150 sends the registration request to the computer 10 through a short-range communication for connection identification. The device registration module 150 sends the registration request by performing Bluetooth pairing with the computer 10.

In addition, the device registration module 150 sends the registration request to the computer 10 by a two-dimensional code for the connection identification. The device connection module 20 generates the two-dimensional code which stores connection-related information, and the display module 40 displays the generated two-dimensional code. The device registration module 150 sends the registration request by reading the two-dimensional code.

In addition, the device registration module 150 sends the registration request by accepting an input of a PIN code for the connection identification. The device connection module 20 generates the PIN code required for the connection, and the display module 40 displays the generated PIN code. The device registration module 150 sends the registration request to the computer 10 by accepting an input of the PIN code.

It is to be noted that the computer 10 and the user terminal 100 may also receive the registration request for the data communication connection by a method other than that described above.

The device connection module 20 receives the registration request. The device connection module 20 conducts a registration for the user terminal 100, which is a sender of the registration request, for the data communication (step S11).

The storage module 30 stores an identifier of the user terminal 100 which has received the device registration (step S11). In step S11, as the identifier of the user terminal 100, the storage module 30 stores information which can uniquely determine the user terminal 100 as the identifier, where the information includes a media access control (MAC) address, a telephone number, a device number, and the like.

It is to be noted that when the sound assistance system 1 for the Web conference includes multiple user terminals 100, the connection processing is performed in each user terminal 100.

The above is the connection processing.

Sound Assistance Processing

Figure 5:
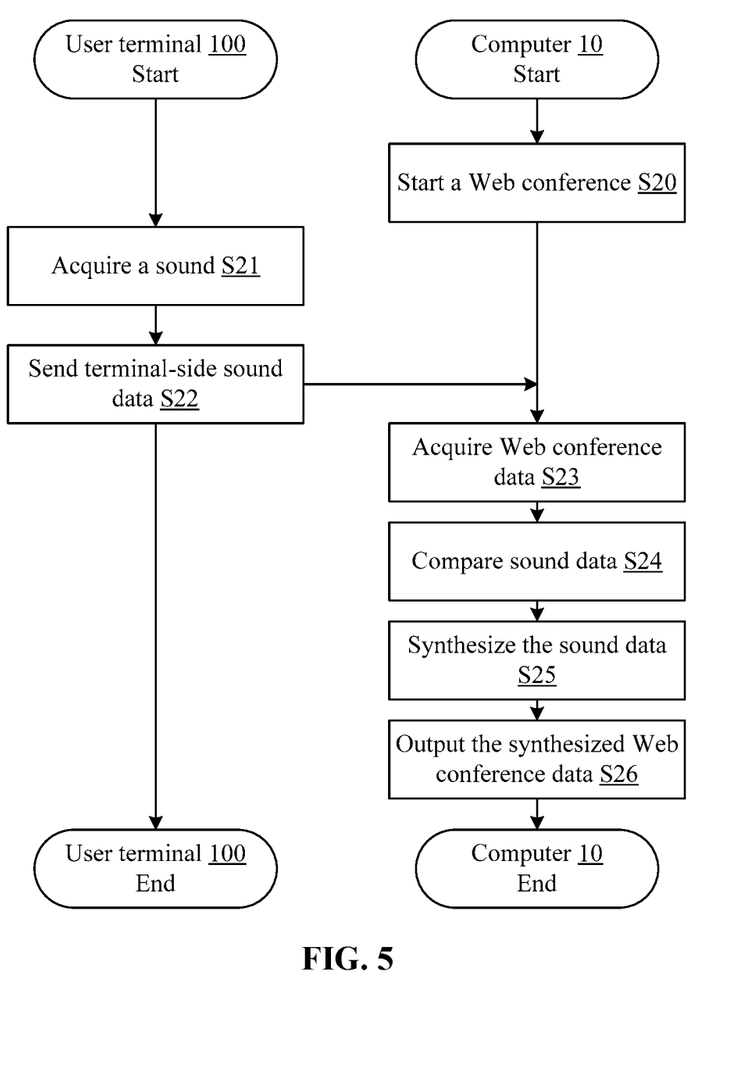
FIG. 5 is a flowchart of sound assistance processing performed by a computer 10 and a user terminal 100.

The sound assistance processing performed by the sound assistance system 1 for the Web conference is described based on FIG. 5. FIG. 5 is a flowchart of the sound assistance processing performed by the computer 10 and the user terminal 100. Processing performed by the modules of the above-mentioned apparatuses is described together with the sound assistance processing.

The Web conference module 21 starts the Web conference with a Web conference system at a remote position which is not shown (step S20). The Web conference module 21 sends captured image data such as dynamic images and stationary images of a participant and sound data of the participant to the Web conference system at the remote position, and receives image data and sound data from the Web conference system at the remote position.

A sound acquisition module 170 on the terminal side acquires a sound from a user (step S21). In step S21, the sound acquisition module 170 acquires the sound of the user from the microphone.

The sound sending module 151 sends the acquired sound as the terminal-side sound data to the computer 10 (step S22).

The sound receiving module 22 receives the terminal-side sound data. The Web conference data acquisition module 41 acquires Web conference data (step S23). In step S23, the Web conference data acquired by the Web conference data acquisition module 41 is data obtained by combining user image data for captured images of the user who participates in the Web conference, such as the dynamic images and the stationary images of the whole body and the face of the user and user sound data collecting sound of the user. The sound from the user is approximately the same as the sound acquired by the terminal-side sound acquisition module 170 in step S21 described above. Processing from step S21 to step S23 refers to that a microphone of the user terminal 100 and a microphone of the computer 10 separately acquire the sound when the user utters the sound.

The sound comparison module 42 compares the received terminal-side sound data with the user sound data included in the acquired Web conference data (step S24). In step S24, the sound comparison module 42 extracts waveform patterns in conformity to a sound of each user from the terminal-side sound data and the user sound data. The sound comparison module 42 identifies waveform patterns with different amplitude sizes and similar shapes among the waveform patterns as a sound from a same user, and determines a waveform pattern with the larger amplitude as sound data to be outputted.

Figure 6:
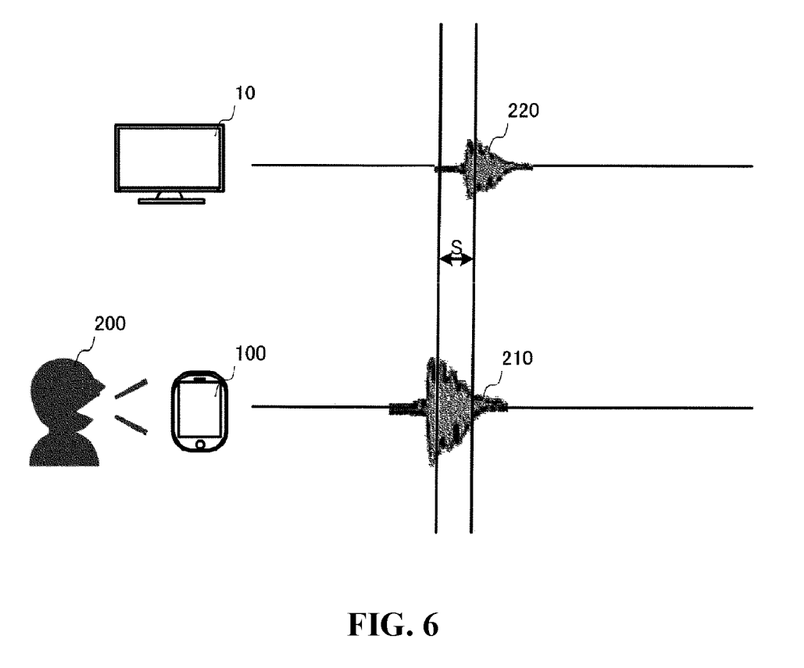
FIG. 6 shows an example schematically showing a state of a comparison between terminal-side sound data and user sound data.

Processing performed by the sound comparison module 42 is described based on FIG. 6. FIG. 6 shows an example schematically showing a state of a comparison between the terminal-side sound data and the user sound data.

In FIG. 6, a user 200 utters a sound towards the user terminal 100, and the computer 10 also acquires the sound uttered towards the user terminal 100. The user terminal 100 sends the sound as the terminal-side sound data to the computer 10. The computer 10 receives the terminal-side sound data, and the sound comparison module 42 compares the terminal-side sound data with the user sound data.

The sound comparison module 42 extracts an amplitude 210 from the terminal-side sound data. In addition, the sound comparison module 42 extracts an amplitude 220 from the user sound data. Since the amplitude 210 and the amplitude 220 have different sizes and approximately same waveform patterns, it is determined that the amplitude 210 and the amplitude 220 are the sound of the same user 200. In this case, for the amplitude 210 and the amplitude 220, although they are the sound of the same user 200, there is a time difference S between a moment when the sound reaches the user terminal 100 and a moment when the sound reaches the computer 10.

The sound synthesis module 43 synthesizes the Web conference data and the terminal-side sound data (step S25). In step S25, the sound synthesis module 43 synthesizes the user sound data included in the Web conference data and the terminal-side sound data. At this time, the sound synthesis module 43 corrects the time difference S between the user sound data and the terminal-side sound data, and synthesizes the user sound data and the terminal-side sound data. For example, the sound synthesis module 43 selects the sound with the larger amplitude in a specified interval (e.g., an interval of 1 second or until an interrupted conversation) from the terminal-side sound data or the user sound data, and deletes the sound with the smaller amplitude. In this case, the sound synthesis module 43 corrects the time difference S in the specified interval (for example, in the case of the interval of 1 second, the interval of 1 second is added by the time difference S to obtain the specified interval. In addition, in the case where the conversation is interrupted, a moment obtained by adding a moment when the conversation is interrupted by the time difference S is used as the specified interval), the sound with the larger amplitude is selected, and the sound with the smaller amplitude is deleted. Therefore, for example, within about 10 seconds, when the user 200 leaves the user terminal 100 and moves towards the vicinity of the computer 10, the sound from the user terminal 100 is firstly acquired, and the amplitudes are compared. Since an amplitude of the sound from the user terminal 100 is larger, the sound from the user terminal 100 is selected. Then, since an amplitude of the sound acquired by the computer 10 is larger than that of the sound from the user terminal 100, the sound acquired by the computer 10 is selected. In this way, the sound acquired by the computer 10 and the sound acquired by the user terminal 100 are synthesized.

The synthetic data output module 23 outputs the synthesized Web conference data, which is obtained by synthesizing the Web conference data and the terminal-side sound data, to the connected Web conference system at the remote position which is not shown (step S26).

It is to be noted that in the preceding processing, processing for synthesizing the Web conference data and the terminal-side sound data may not necessarily be performed by the computer 10, and may also be performed by the user terminal 100. In addition, when the Web conference system is implemented by a computer with a server function which is not shown, the processing may be performed by the computer.

The above are the sound assistance processing.

The above-mentioned methods and functions are implemented by reading and executing specified programs by a computer (including a CPU, an information processing apparatus and various terminals). The programs are provided, for example, in the form of being provided by the computer (software as a service (SaaS)) via a network. The programs are provided, for example, in the form of being recorded on a computer-readable recording medium such as a floppy disk, a compact disk (CD) (such as a compact disc read-only memory (CD-ROM)), and a digital versatile disc (DVD) (such as a digital versatile disc read-only memory (DVD-ROM) and a digital versatile disc random access memory (DVD-RAM)). In this case, the computer reads the programs from the recording medium and transfers the programs to an internal storage apparatus or an external storage apparatus for storage and execution. In addition, the programs may also be recorded in advance on a storage apparatus (recording medium) such as a magnetic disk, an optical disk or a magneto-optical disk, and provided from the storage apparatus for the computer via a communication line.

The embodiments of the present disclosure have been described above, but the present disclosure is not limited to the above-mentioned embodiments. In addition, the effects described in the embodiments of the present disclosure are merely illustrative of the best effects produced by the present disclosure, and the effects of the present disclosure are not limited to the effects described in the embodiments of the present disclosure.

EFFECTS OF THE PRESENT DISCLOSURE

The present disclosure can provide a computer system, a sound assistance method for a Web conference, and a program, which can easily perform a conversation without setting a dedicated microphone.

LIST OF REFERENCE NUMBERS

1: Sound assistance system for a Web conference; 10: computer; 100: user terminal.

What is claimed is:
1. A Web conference system, which comprises a computer and a user terminal, and performs sound assistance for a Web conference, wherein the computer comprises:
   a processor; and
   a memory for storing instructions executable by the processor, wherein the processor is configured to:
   connect the computer to the user terminal for a data communication;
   acquire a sound from a microphone of the user terminal;
   acquire Web conference data from the Web conference system, wherein the Web conference data includes user sound data of a user;
   compare the user sound data with the acquired sound by:
     extracting waveform patterns for the user from each of the acquired sound and the user sound data; and
     identifying, for a sound, between the acquired sound and the user sound data, waveform patterns with different amplitude sizes and similar shapes from the extracted waveform patterns;
   perform synthesis to generate synthesized Web conference data by:
     selecting, between the acquired sound and the user sound data, a sound corresponding to an identified waveform pattern with a larger amplitude in a specified interval; and deleting, between the acquired sound and the user sound data, a sound corresponding to an identified waveform pattern with a smaller amplitude in the specified interval; and output the synthetic Web conference data after the synthesis.

2. The Web conference system of claim 1, wherein the processor is further configured to:

connect the computer to the user terminal by a short-range communication for connection identification.

3. The Web conference system of claim 1, wherein the processor is further configured to:

connect the computer to the user terminal by a two-dimensional code for connection identification.

4. The Web conference system of claim 1, wherein the processor is further configured to:

connect the computer to the user terminal by inputting a personal identification number (PIN) code for connection identification.

5. The Web conference system of claim 1, wherein the processor is further configured to:

synthesize the user sound data and the acquired sound by correcting respective acquisition moments.

6. A sound assistance method for a Web conference, which is executed by a Web conference system, wherein the Web conference system comprises a computer and a user terminal and performs sound assistance for a Web conference, and the method comprises:

connecting the computer to the user terminal for a data communication;

acquiring a sound from a microphone of the user terminal;

acquiring Web conference data from the Web conference system, wherein the Web conference data comprises user sound data of a user;

comparing the user sound data with the acquired sound by:

extracting waveform patterns for the user from each of the acquired sound and the user sound data; and identifying, for a sound, between the acquired sound and the user sound data, waveform patterns with different amplitude sizes and similar shapes from the extracted waveform patterns;

performing synthesis to generate synthesized Web conference data by:

selecting, between the acquired sound and the user sound data, a sound corresponding to the identified waveform pattern with a larger amplitude in a specified interval; and deleting, between the acquired sound and the user sound data, a sound corresponding to an identified waveform pattern with a smaller amplitude in the specified interval; and outputting the synthetic Web conference data after the synthesis.

7. A non-transitory computer readable storage medium, storing computer executable instructions, wherein the computer executable instructions are configured to enable a Web conference system comprising a computer and a user terminal, which performs sound assistance for a Web conference to perform:

connecting the computer to the user terminal for a data communication;

acquiring a sound from a microphone of the user terminal;

acquiring Web conference data from the Web conference system, wherein the Web conference data comprises user sound data of a user;

comparing the user sound data with the acquired sound by:

extracting waveform patterns for the user from each of the acquired sound and the user sound data; and Identifying, for a sound, between the acquired sound and the user sound data, waveform patterns with different amplitude sizes and similar shapes from among the waveform patterns;

performing synthesis to generate synthesized Web conference data by:

selecting, between the acquired sound and the user sound data, a sound corresponding to the identified waveform pattern with a larger amplitude in a specified interval; and deleting, between the acquired sound and the user sound data, a sound corresponding to an identified waveform pattern with a smaller amplitude in the specified interval; and outputting the synthetic Web conference data after the synthesis.

* * * * *